US011951887B2

(12) United States Patent
Schulz et al.

(10) Patent No.: US 11,951,887 B2
(45) Date of Patent: Apr. 9, 2024

(54) REAR SEAT ARRANGEMENT FOR A VEHICLE, AND A VEHICLE HAVING SAME

(71) Applicants: HYUNDAI MOTOR COMPANY, Seoul (KR); KIA MOTORS CORPORATION, Seoul (KR)

(72) Inventors: David Schulz, Bischofsheim (DE); Urs Schiel, Laudenbach (DE); Florent Larrosa, Breithardt (DE); Esteve Josa, Großostheim (DE)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 520 days.

(21) Appl. No.: 17/192,680

(22) Filed: Mar. 4, 2021

(65) Prior Publication Data

US 2021/0284051 A1 Sep. 16, 2021

(30) Foreign Application Priority Data

Mar. 13, 2020 (DE) .......................... 102020203229.7

(51) Int. Cl.
*B60N 2/50* (2006.01)
*B60N 2/005* (2006.01)
*B60N 2/20* (2006.01)
*B60N 2/22* (2006.01)
*B60N 2/54* (2006.01)
*B60N 2/68* (2006.01)

(52) U.S. Cl.
CPC ............. *B60N 2/503* (2013.01); *B60N 2/005* (2013.01); *B60N 2/20* (2013.01); *B60N 2/2245* (2013.01); *B60N 2/54* (2013.01); *B60N 2/688* (2013.01)

(58) Field of Classification Search
CPC .................................................... B60N 2/2245
See application file for complete search history.

(56) References Cited

U.S. PATENT DOCUMENTS

| 6,113,180 | A | * | 9/2000 | Corporon | B62D 25/08 296/198 |
|---|---|---|---|---|---|
| 7,464,963 | B2 | | 12/2008 | Hepner et al. | |
| 8,662,561 | B2 | * | 3/2014 | Runde | B60N 2/24 296/65.09 |
| 9,016,795 | B2 | | 4/2015 | Nakagaki et al. | |
| 9,346,374 | B2 | * | 5/2016 | Sayama | B60N 2/01516 |
| 10,086,792 | B1 | * | 10/2018 | Watanabe | B60N 2/688 |
| 10,293,712 | B2 | * | 5/2019 | Ruan | B60N 2/065 |
| 2006/0273566 | A1 | | 12/2006 | Hepner et al. | |
| 2012/0267936 | A1 | | 10/2012 | Nakagaki et al. | |

FOREIGN PATENT DOCUMENTS

| DE | 102014226133 | B4 | | 6/2021 |
|---|---|---|---|---|
| EP | 1625053 | B1 | | 7/2007 |
| EP | 2495125 | A1 | | 9/2012 |
| GB | 2062562 | | * | 5/1981 |
| KR | 20160059045 | A | | 5/2016 |
| WO | 2004108485 | A1 | | 12/2004 |

* cited by examiner

*Primary Examiner* — Joseph D. Pape
(74) *Attorney, Agent, or Firm* — Lempia Summerfield Katz LLC

(57) ABSTRACT

A vehicle, and a rear seat arrangement for a vehicle, includes at least one backrest. The at least one backrest comprises a strut bar, and at least one of the at least one backrest is adapted to be pivotally folded into a backward folded position for connecting the strut bar to a mounting structure at a body of the vehicle.

14 Claims, 10 Drawing Sheets

REAR SEAT ARRANGEMENT FOR A VEHICLE, AND A VEHICLE HAVING SAME

RELATED APPLICATION DATA

This application claims the benefit of and priority to German national application no. 10 2020 203 229.7 filed on Mar. 13, 2020. The entire content of this prior filed application is incorporated herein by this reference.

TECHNICAL FIELD

The present disclosure relates to a rear seat arrangement and to a vehicle having a rear seat arrangement, and more particularly to a car having a rear seat arrangement.

BACKGROUND

Vehicles with high-performance engines, e.g. for off-road driving or racing, may have higher requirements regarding the rigidity of the body of the vehicle. Strut bars (i.e. stiffener bars) may be provided which are adapted to tying two strut towers together. Herein, the strut tower refers to a structure comprising springs and shock absorbers, which enable the suspension to compensate for an unevenness of the road. By installing a strut bar, a combined suspension system is provided which can increase the stiffness and can prevent one of the suspension sides being compressed in an uneven manner.

An example of a strut bar is known from KR 2016/0059045 A, which discloses a strut bar having a body part with a hollow shape.

Typically, strut bars are provided as optional equipment to be manually installed. The strut bar is therefore installed as a separate component, which requires additional weight and package space.

Also, the direct load path for a rear strut bar is typically straight across the luggage compartment, thereby reducing the load capacity of the compartment by a significant amount. Further, it is difficult to load long items due to the reduced storage space.

Further, tooling is required to remove the strut bar and holes remain in the inner rim of the trunk after removing the strut bar.

Consequently, there is a need to provide a more convenient way to arrange a strut bar in a car.

SUMMARY OF THE DISCLOSURE

The present disclosure relates to a rear seat arrangement and a vehicle including such a rear seat arrangement, as disclosed and described herein.

Further embodiments of the present disclosure are the subject of the claims and provided in the following description, referring to the drawings.

According to a first aspect, the disclosure provides a rear seat arrangement for a vehicle, the rear seat arrangement having at least one backrest. The at least one backrest comprises a strut bar. At least one of the at least one backrest is adapted to be pivotally folded into a backward folded position for connecting the strut bar to a mounting structure at a body (i.e. a body in white) of the vehicle.

According to a second aspect, the disclosure provides a vehicle having a body with a mounting structure for a strut bar. The vehicle further comprises a rear seat arrangement such that the strut bar of the rear seat arrangement is connectable to the mounting structure of the body of the vehicle.

The idea of the disclosure is to integrate the strut bar in the rear seat arrangement. The strut bar is brought into the correct mounting position by folding the backrests of the rear seat arrangement to a backward folded position, i.e. towards the rear end of the vehicle. The angle of the at least one backrest relative to the normal seating position can depend on the overall package of the vehicle, i.e. the relative position of (a) the backrest and (b) the mounting structure for the strut bar in the optimum load path.

Accordingly, the disclosure provides a fully integrated system for use in improved rear seats. A strut bar arranged in the rear seats can be used to stiffen the body of the vehicle at the vehicle's rear for improving ride and handling performance. The strut bar has no negative influence on the daily use of the vehicle.

An advantage of the rear seat arrangement according to the disclosure is that the trunk capacity is not influenced or reduced by the strut bar. In particular, the backrests may be folded in a forward folded position, i.e. towards the front end of the vehicle. In this position, long items may be loaded without or with negligible interference with the strut bar.

Further, the overall weight of the vehicle can be reduced by integrating the strut bar at least partially in the backrests. In particular, already required structures of the backrest may be used to implement the strut bar.

Also, no additional components are needed. Accordingly, no additional package space is required. Further, there is no need to remove the strut bar for better trunk usability.

According to an embodiment of the rear seat arrangement, the backrests may be folded into three different positions, i.e., the backward folded position, a normal upright position, and a forward folded position for increased loading capacity.

According to an embodiment of the rear seat arrangement, the strut bar comprises at least one locking mechanism for firmly connecting the strut bar to the mounting structure at the body of the vehicle. In an embodiment, the locking mechanism is a quick-lock mechanism, allowing a user to easily disengage the strut bar from the mounting structure to return the backrests again to the upright normal position. The locking mechanism may comprise at least one of screws, clamps, latches, bars, and the like.

According to an embodiment of the rear seat arrangement, a single backrest may comprise the entire strut bar. According to further embodiments, several backrests together comprise the strut bar.

According to a further embodiment the rear seat arrangement comprises a plurality of backrests. At least two backrests of the plurality of backrests comprise respective strut bar segments of the strut bar. The strut bar segments of the strut bar are connectable to each other. For example, the rear seat arrangement may comprise four or five backrests. The inner two or three backrests may correspond to seats for up to three passengers, whereas the outer two backrests are firmly arranged or only foldable in the forward direction.

According to a further embodiment of the rear seat arrangement, the strut bar segments are connectable to each other via a plug-in connection.

According to a further embodiment of the rear seat arrangement, at least one of the strut bar segments is slidably installed for moving between a mounted position and an unmounted position. In the mounted position, the strut bar segment is connected to an adjacent strut bar segment, and in the unmounted position, the strut bar segment is disconnected from the adjacent strut bar segment.

According to a further embodiment of the rear seat arrangement, the at least two backrests comprising the respective strut bar segment are adapted to be independently folded in a condition when the strut bar segments are not connected to each other. This has the advantage that individual strut bar segments can be brought into a backward or forward folded position, if needed.

According to a further embodiment, the rear seat arrangement has two outer backrests and at least one inner backrest, wherein the at least one inner backrest comprises the strut bar.

According to a further embodiment of the rear seat arrangement, only the at least one inner backrest is adapted to be pivotally folded into the backward folded position. The outer backrests may be fixed or may be foldable only in a forward direction.

According to a further embodiment of the rear seat arrangement, the at least one backrest comprises a supporting frame. The strut bar is at least partially formed by at least part of the supporting frame. This helps to save weight because no additional strut bar structures, or only few additional strut bar structures, are required on top of the already required supporting frame of the at least on backrest. Further, this helps to include a strut bar in the backrest without any additional space requirement.

According to a further embodiment of the rear seat arrangement, the strut bar is attached to a back portion of the at least one backrest. For example, the strut bar may be welded or attached via screws or any other connecting mechanism to the backrest. This allows upgrading or retrofitting already existing backrests to include the strut bar.

According to a further embodiment of the rear seat arrangement, the at least one backrest comprises a mounting device for mounting a racing seatbelt. Four-, five-, or six-point racing seatbelts or harnesses require additional attachment points for the top mounted belts that hold the shoulders and upper body of the driver. The strut bar may provide the required support for attaching the racing seatbelt. Further, correct attachment of the racing seatbelt imposes a condition on the angle between the racing seatbelt and a horizontal plane, i.e., that the angle is below a predefined value. By incorporating the strut bar in the rear seat arrangement, the angle of folding back the backrests to the backward folded position can be selected in a way that the requirement regarding the angle between the racing seatbelt and the horizontal plane is fulfilled. Thus, it is readily possible to integrate racing seatbelts, further improving the racing ability of the vehicle.

According to a further embodiment of the vehicle, the mounting structure at the body of the vehicle comprises at least one latch for fixing the strut bar to the body of the vehicle.

According to a further embodiment of the vehicle, the mounting structure comprises at least one screw connection for fixing the strut bar to the body of the vehicle.

According to a further embodiment, the vehicle further comprises an actuator adapted to automatically fix the strut bar to the body of the vehicle via the screw connection. Further, a sensor may be provided for detecting that the strut bar has been brought into the mounting position, i.e. that the backrests have been brought into the backward folded position. The sensor provides a sensor signal to a controller, which controls the actuator to automatically fix the strut bar to the body of the vehicle via the screw connection. Therefore, the strut bar is firmly installed without the requirement of any manual interaction of the driver.

Generally, the seatbacks may be arranged in the stiffening position without tooling, either manually or automatically, e.g. driven by electronic actuators, or semi-automatically, e.g. by folding back the seatback manually but automatically fixing the strut bar.

According to a further embodiment, the vehicle further comprises a racing seatbelt connectable or connected to a mounting device of the at least one backrest of the rear seat arrangement.

According to a further embodiment, the vehicle further comprises rear dampers and springs, wherein the mounting structure for the strut bar is arranged in a load path of the rear dampers and springs. Therefore, the strut bar is arranged between the top mounts of the rear axle suspension, i.e. in the optimal position for increasing the stiffness of the vehicle.

The features described herein for the rear seat arrangement are also disclosed for the vehicle and vice versa.

BRIEF DESCRIPTION OF THE FIGURES

The accompanying drawings are included to provide a further understanding of the present disclosure and are incorporated in and constitute a part of this specification. The drawings illustrate the embodiments of the present disclosure and together with the description serve to explain the principles of the disclosure. Other embodiments of the present disclosure and many of the intended advantages of the present disclosure should be readily appreciated as they become better understood by reference to the following detailed description. The elements of the drawings are not necessarily to scale relative to each other. In the figures, like reference numerals denote like or functionally like components, unless indicated otherwise.

Although specific embodiments are illustrated and described herein, it should be appreciated by those of ordinary skill in the art that a variety of alternate and/or equivalent implementations may be substituted for the specific embodiments shown and described without departing from the scope of the present disclosure. Generally, this application is intended to cover any adaptations or variations of the specific embodiments discussed herein.

DETAILED DESCRIPTION OF THE EMBODIMENTS

Figure 1:
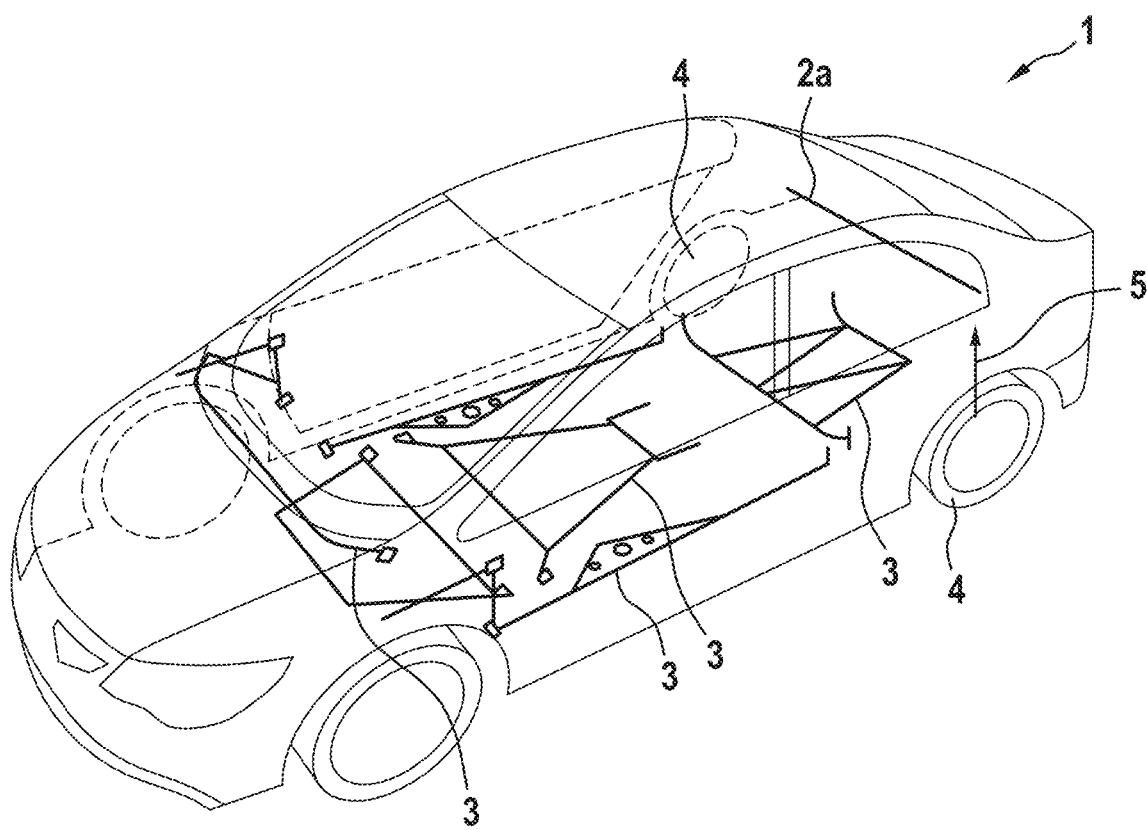
FIG. 1 shows a schematic view of a vehicle illustrating the position of a strut bar in a backward folded position of the at least one backrest according to the teachings of the present disclosure.

FIG. 1 shows a schematic view of a vehicle 1. In addition to several stiffening structures 3, the vehicle 1 comprises a strut bar 2a, which is integrated in or arranged on at least one backrest (not illustrated) of the vehicle 1.

Herein, the term "backrest" refers to structural elements of the back seat, which are or can be brought into an upright position for normal operation, i.e. in a seating position. The term "backrest" may refer to individual components, which may be detached from each other.

At least some of the backrests may be pivotally folded into a forward folded position and/or a backward folded position. The forward folded position refers to a loading position, i.e. to increase the trunk volume or for the transport of long items. There may be a single backrest which may be folded as a single piece. Also, there can be several backrests, for example two backrests that can be folded individually. The backrests may split the entire backseat in any ratio, e.g. in a 60/40 configuration. It is also possible that only some of the backrests are foldable, while the others are firmly attached, i.e., fixed in position. Moreover, only some of the backrests may be foldable in a backward folded position, while the other backrests are firmly attached or only foldable in a forward folded position.

The position of the strut bar 2a is shown in a backward folded position of the at least one backrest, i.e. in a position where the at least one backrest is folded towards the rear end of the vehicle 1. In the backward folded position, the strut bar 2a is located in a load path 5 of rear dampers and springs corresponding to rear wheels 4 of the vehicle.

Figure 2:
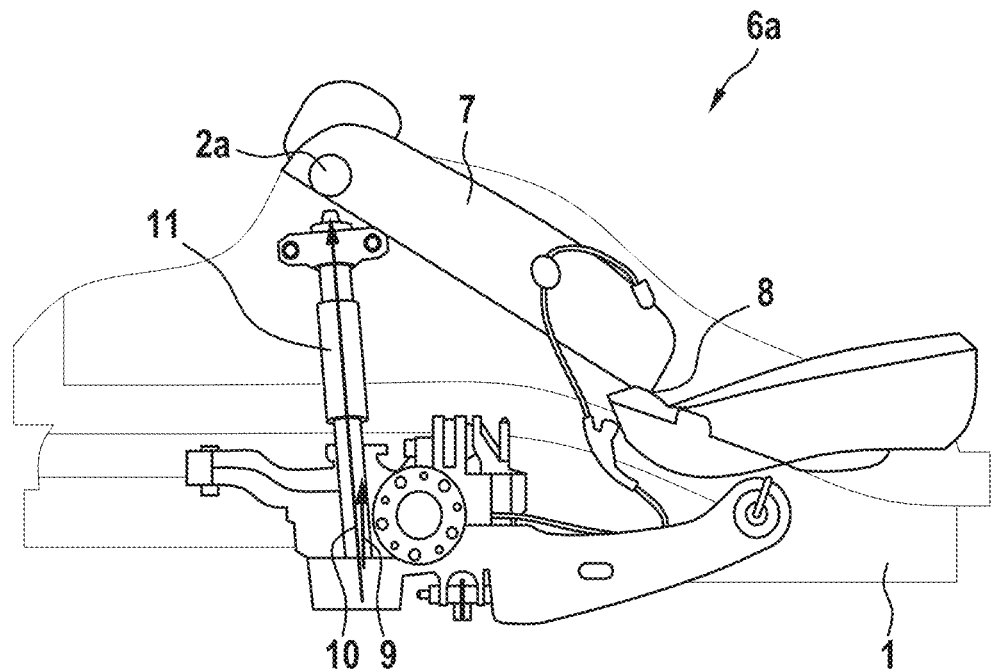
FIG. 2 shows a schematic cross section of a rear seat arrangement according to an embodiment of the disclosure.

FIG. 2 shows a schematic cross section of a rear seat arrangement 6a comprising a backrest 7, which can be pivotally folded around a pivot axis 8 into the backward folded position illustrated in FIG. 2. The strut bar 2a is integrated in the backrest 7 and is located in a damper load direction 10 of a damper 11 and a spring load direction 9 of a spring.

Figure 3:
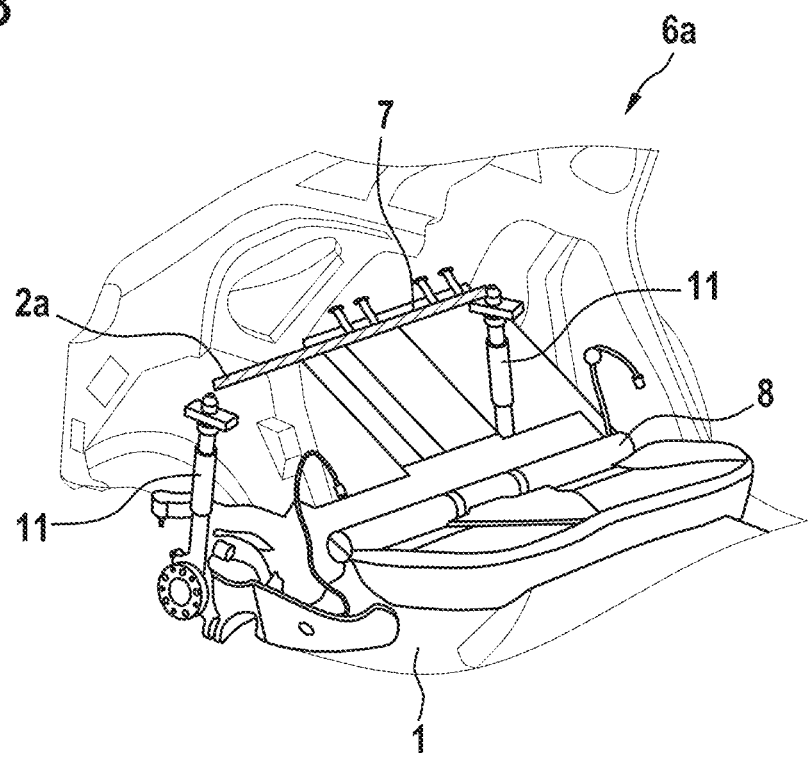
FIG. 3 shows a schematic diagonal view of the rear seat arrangement of FIG. 2.

FIG. 3 shows a schematic diagonal view of the rear seat arrangement 6a of FIG. 2.

Figure 4:
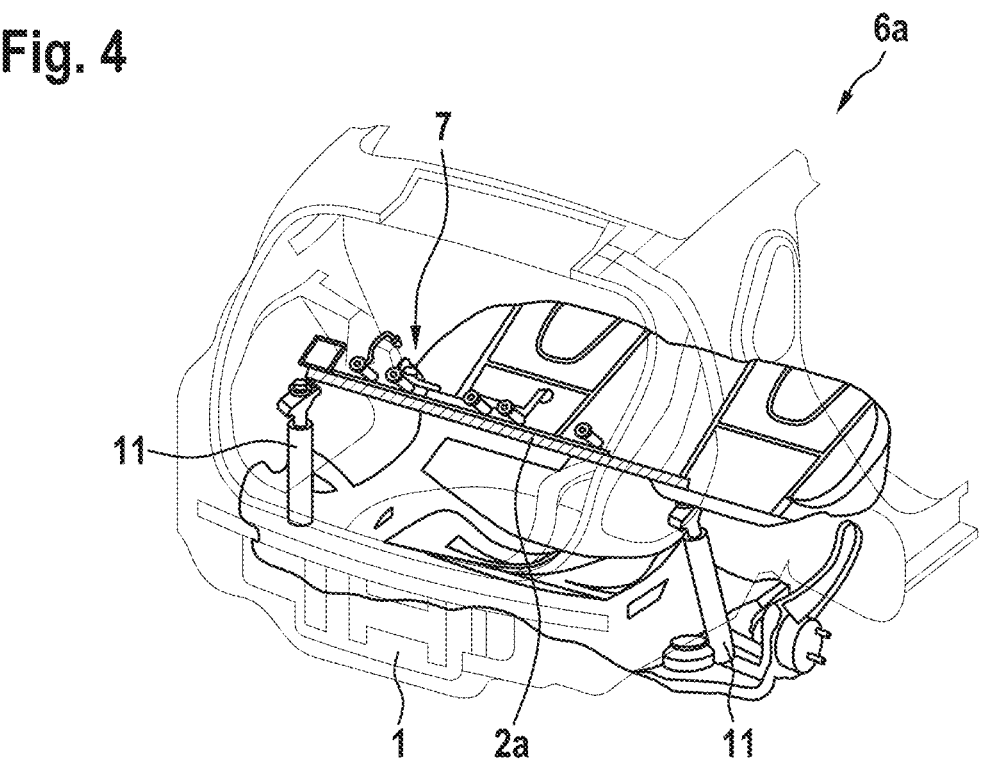
FIG. 4 shows a further schematic diagonal view of the rear seat arrangement of FIGS. 2 and 3.

FIG. 4 shows a further schematic diagonal view of the rear seat arrangement 6a of FIGS. 2 and 3.

Figure 5:
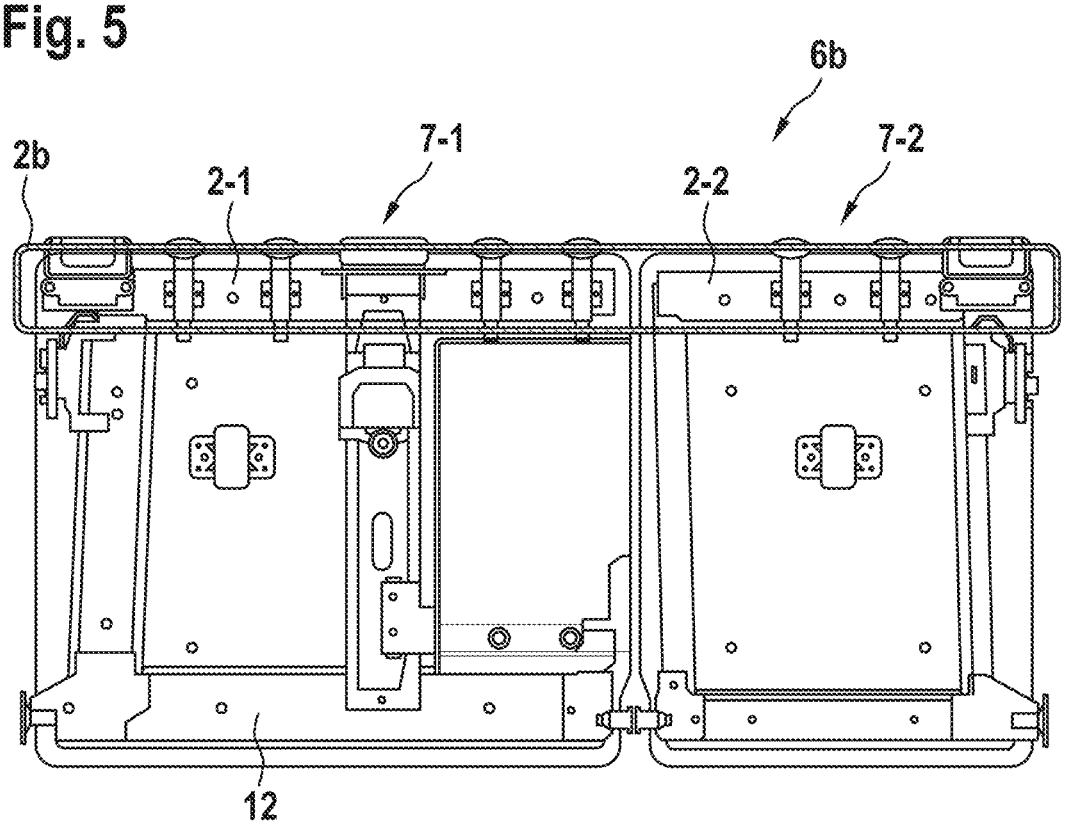
FIG. 5 shows a schematic front view of backrests of a rear seat arrangement according to a further embodiment of the disclosure.

FIG. 5 shows a schematic front view of a further rear seat arrangement 6b. The rear seat arrangement 6b comprises two backrests 7-1 and 7-2, which can be folded independently of each other. A location of a strut bar 2b is illustrated, wherein the strut bar is divided into two strut bar segments 2-1 and 2-2, which can be connected to each other. Each strut bar segment 2-1 and 2-2 is integrated in one of the backrests 7-1 and 7-2, respectively. In an embodiment, the strut bar segments 2-1 and 2-2 are part of or integrally formed with a supporting frame 12 of the backrests 7-1 and 7-2.

Figure 6:
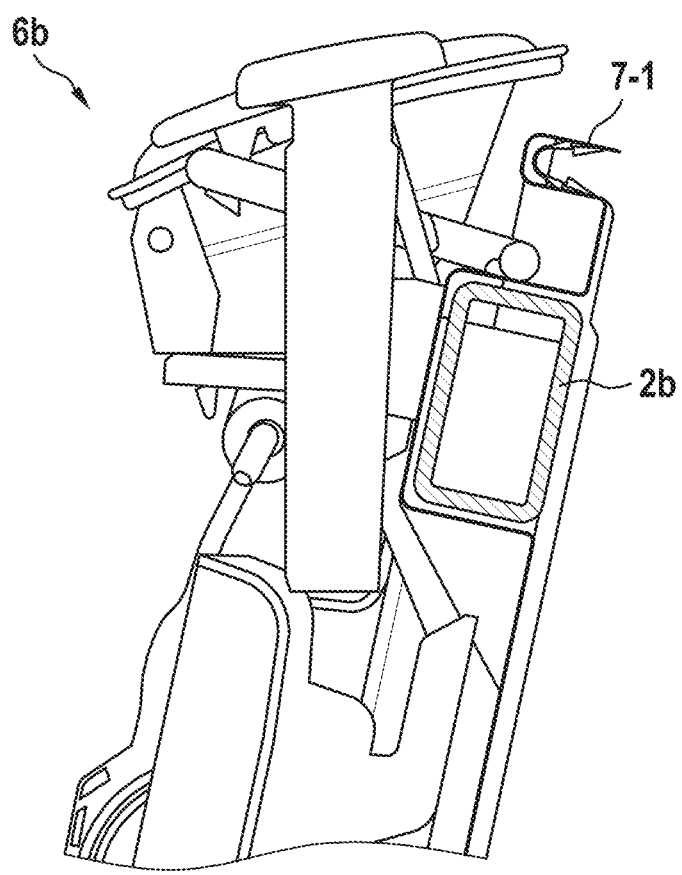
FIG. 6 shows a schematic side view of the backrests of FIG. 5.

FIG. 6 shows a schematic side view of the backrest 7-1 of FIG. 5, showing a possible location of the strut bar 2b.

Figure 7:
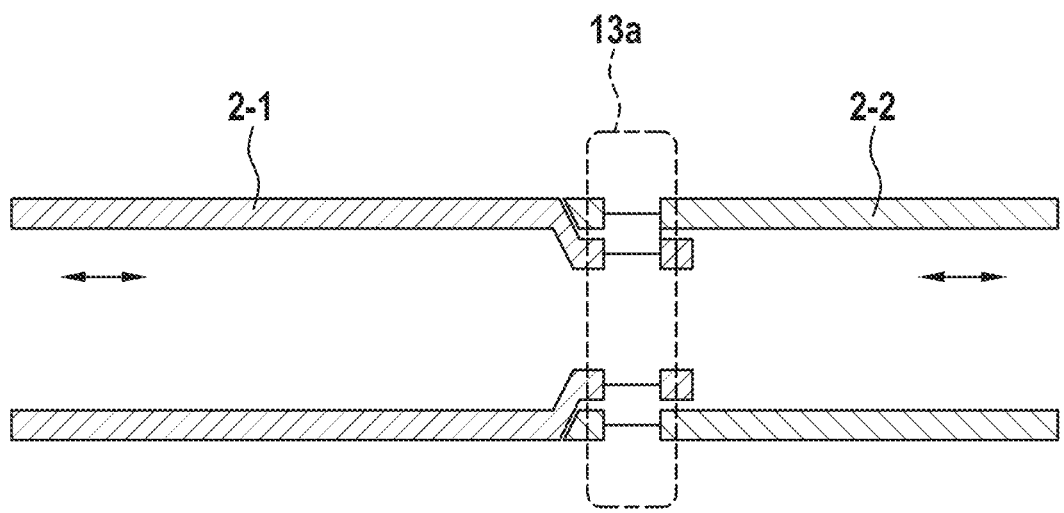
FIG. 7 shows a schematic illustration of a plug-in connection of two adjacent strut bar segments of a rear seat arrangement according to a further embodiment of the disclosure.

FIG. 7 shows a schematic illustration of a plug-in connection of two adjacent strut bar segments 2-1, 2-2 of a rear seat arrangement. The strut bar segments 2-1 and 2-2 are slidably installed for moving between a mounted position, wherein the strut bar segments 2-1, 2-2 are connected to each other, and an unmounted position, wherein the strut bar segments 2-1, 2-2 are disconnected. The strut bar segments 2-1 and 2-2 can be connected to each other with a plug-in connection 13a.

Figure 8:
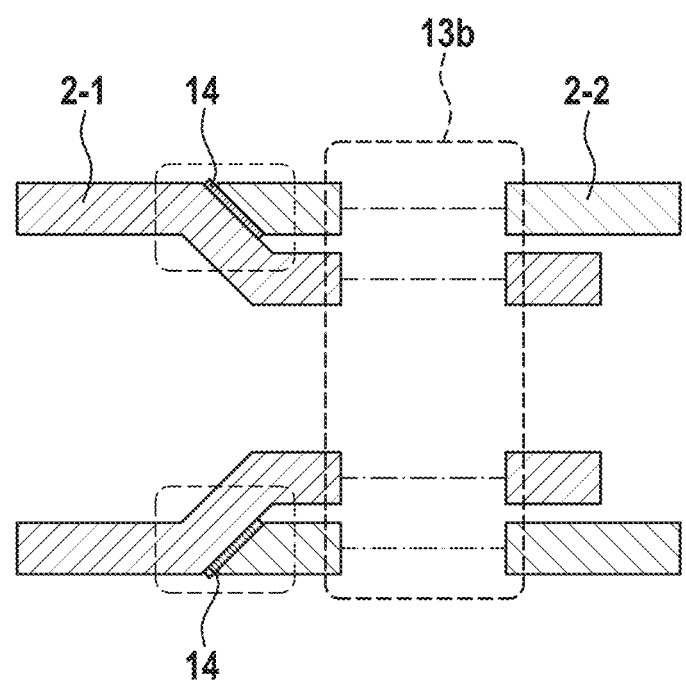
FIG. 8 shows a detailed view of a further plug-in connection of two adjacent strut bar segments according to a further embodiment of the disclosure.

FIG. 8 shows a detailed view of FIG. 7 illustrating a plug-in connection 13b of two adjacent strut bar segments 2-1, 2-2. Direct contact surfaces 14 are provided and which are attached to one or both of the strut bar segments 2-1, 2-2 to improve the direct compression load path between the outer attachment points. The contact surfaces 14 are inclined to facilitate self-centering. The contact surfaces 14 may be magnetic to establish a firm connection. However, this is not required. The strut bar segments 2-1, 2-2 are connected to each other directly without gaps to provide a strut bar suited for axial compression.

Figure 9:
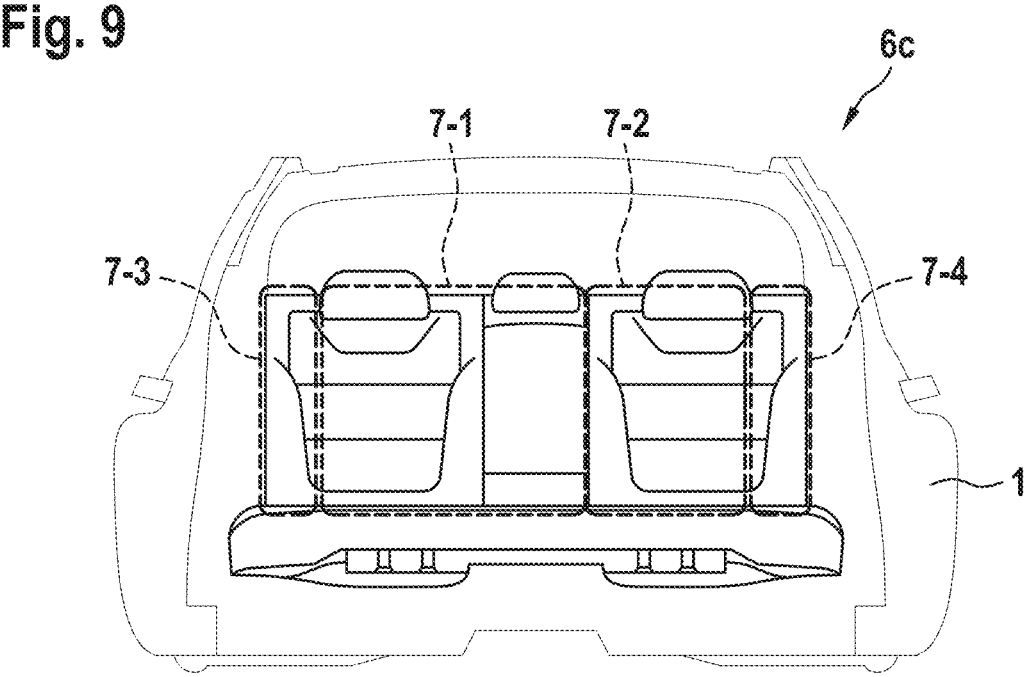
FIG. 9 shows a schematic front view of a rear seat arrangement according to a further embodiment of the disclosure.

FIG. 9 shows a schematic front view of a further rear seat arrangement 6c. In addition to two inner backrests 7-1, 7-2, there is provided an additional outer backrest 7-3, 7-4 at each side. Only the inner backrests 7-1, 7-2 comprise the strut bar and can be folded into a backward folded position.

Figure 10:
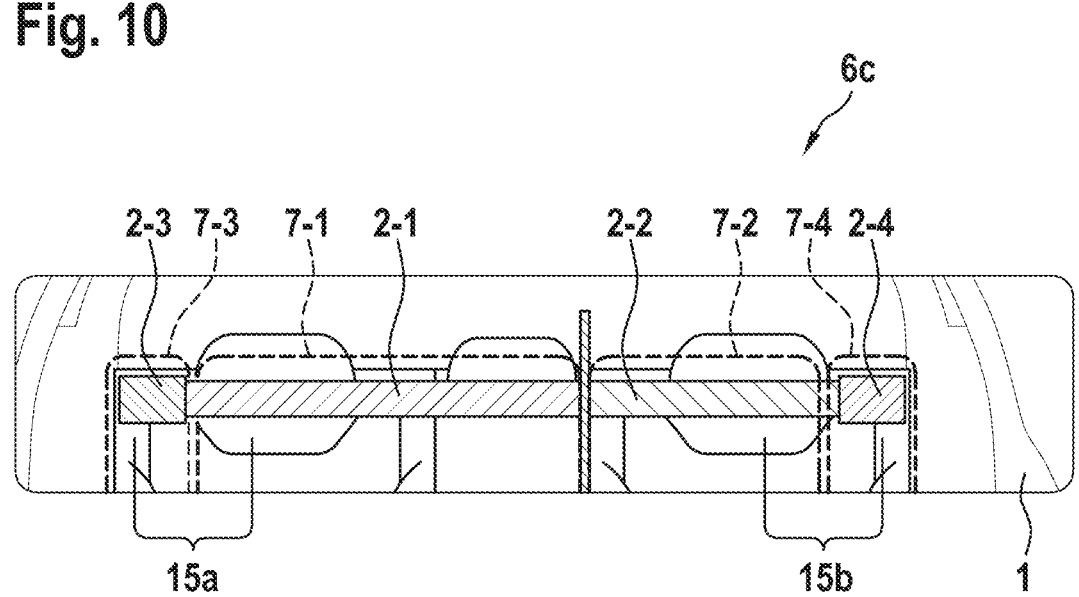
FIG. 10 shows a detailed schematic front view of the rear seat arrangement of FIG. 9 illustrating a connection of outer strut bar segments as an example for the installation in the normal (upright) or forward folded position.

FIG. 10 shows a further schematic front view of the rear seat arrangement 6c of FIG. 9 illustrating outer connections 15a, 15b of outer strut bar segments 2-3, 2-4 arranged in the outer backrests 7-3, 7-4 to the inner strut bar segments 2-1, 2-2 arranged in the inner backrests 7-1, 7-2.

Figure 11:
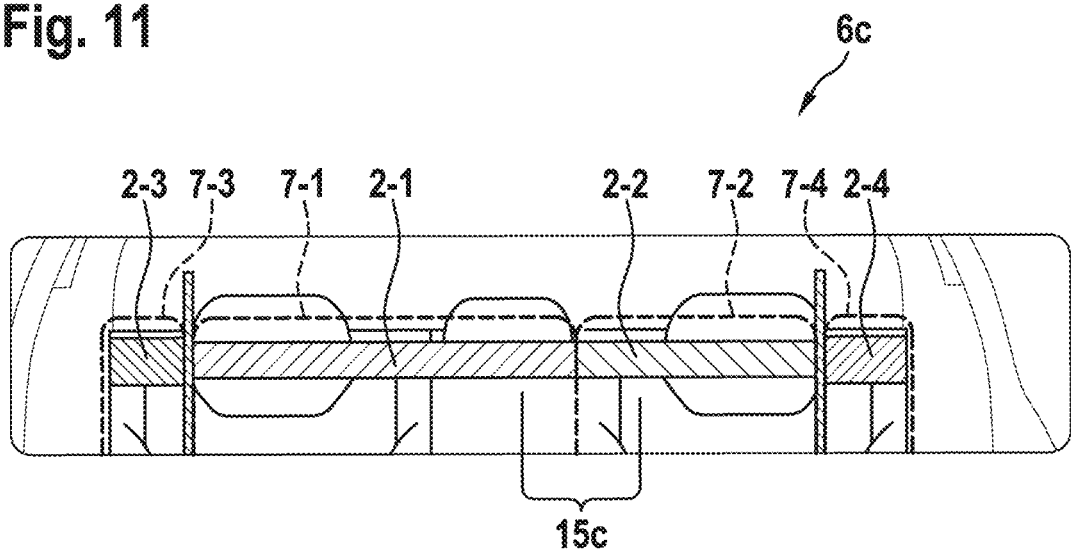
FIG. 11 shows a detailed schematic view of the rear seat arrangement of FIG. 9 illustrating a connection of inner strut bar segments as an example for the backward folded position, where the strut bar is then installed at the mounting points.

FIG. 11 shows a schematic front view of the rear seat arrangement of FIGS. 9 and 10 illustrating an inner connection 15c of the inner strut bar segments 2-1, 2-2, ready to be folded backwards and to be installed in the "stiffening" position.

In the sitting position, the outer backrests 7-3 and 7-4 are connected to the inner backrests 7-1 and 7-2, as shown in FIG. 10.

In the loading position, all of the backrests 7-1 to 7-4 are brought into the forward folded position. Alternatively, the inner backrests 7-1 and 7-2 may be disconnected and only the inner backrests 7-1 and 7-2 are brought into the forward folded position.

In the stiffening position, the inner backrests 7-1 and 7-2 are connected to the outer backrests 7-3 and 7-4. They are connected to each other, thus forming a single strut bar and are brought into the backward folded position and then mounted to a mounting structure at the body of the vehicle 1.

Figure 12:
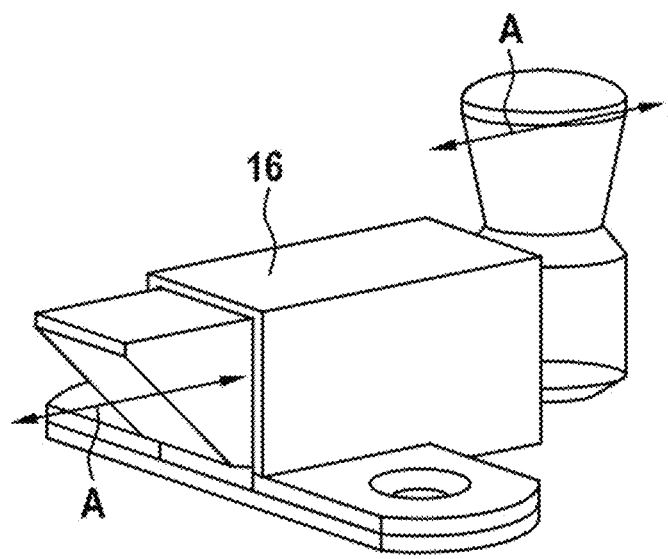
FIG. 12 shows a schematic view of a latch for fixing the strut bar according to an embodiment of the disclosure.

FIG. 12 shows a schematic view of a latch 16 for connecting the separate strut bar segments. The latch 16 is movable in a direction A perpendicular to the strut bar segments 2-1 to 2-4. The latch 16 may be arranged at the backrests 7-1 to 7-4.

Figure 13:
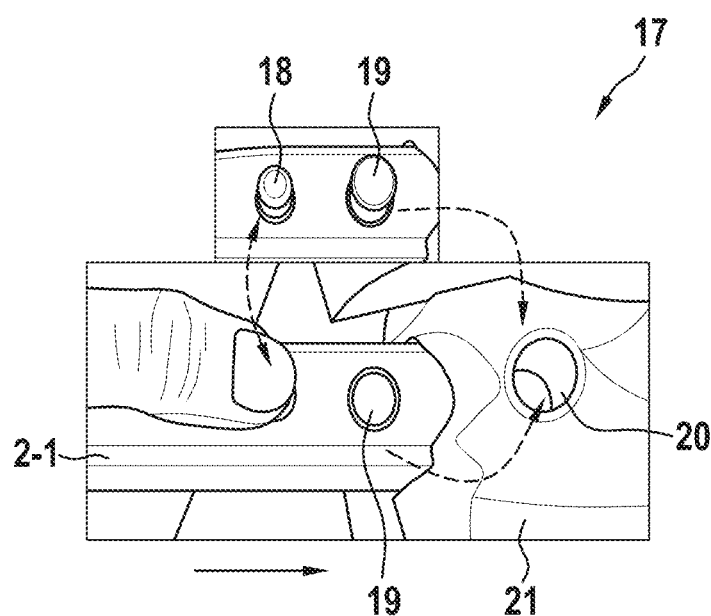
FIG. 13 shows a schematic view of a further connection for fixing the strut bar segments to each other according to a further embodiment of the disclosure.

FIG. 13 shows a schematic view of a further possible mounting connection 17 for fixing the strut bar 2-1. Herein, reference number 21 refers to a mounting element which corresponds to a further strut bar segment 2-1 to 2-4.

Pushing down on a first button 18 arranged on a strut bar segment 2-1 to 2-4 also moves down a second button 19, thereby allowing slidable gliding of the strut bar segment 2-1 to 2-4 into the mounting element 21. If the first button 18 is released, the second button 19 firmly engages with a counterpart 20 of the mounting element 21. The connection can be released again by pushing down the first button 18 and by slidably removing the strut bar segment 2-1 to 2-4 from the mounting element 21.

Figure 14:
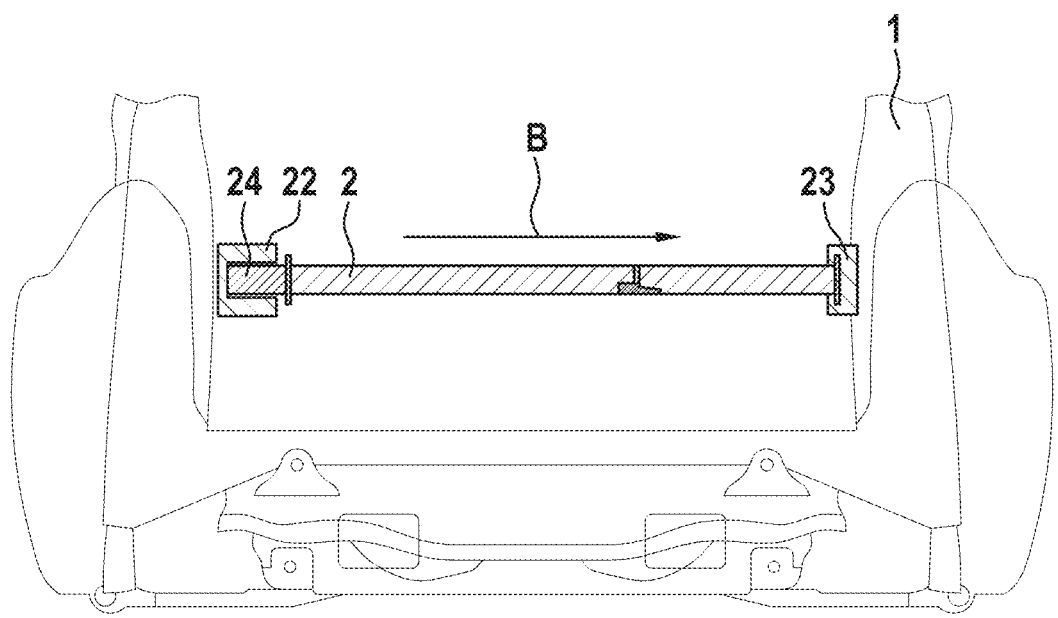
FIG. 14 shows a schematic front view of a mounting mechanism of the strut bar to the body of the vehicle according to an embodiment of the disclosure.

FIG. 14 shows a schematic front view of a mounting mechanism of the strut bar 2 to the body of the vehicle 1. The mounting structure at the body of the vehicle 1 comprises a first mounting structure element 22, a second mounting structure element 23, and a clamping device 24. The first and second mounting structure elements 22, 23 are fixed to the body of the vehicle 1. By moving the strut bar 2 in the moving direction B towards the second mounting structure element 23, which serves as a contact surface, the strut bar 2 firmly engages with the second mounting structure element 23. Further, the clamping device 24 moves towards the strut bar 2 to firmly engage with the strut bar 2, thereby fixing the strut bar between the first and second mounting structure elements 22, 23.

Figure 15:
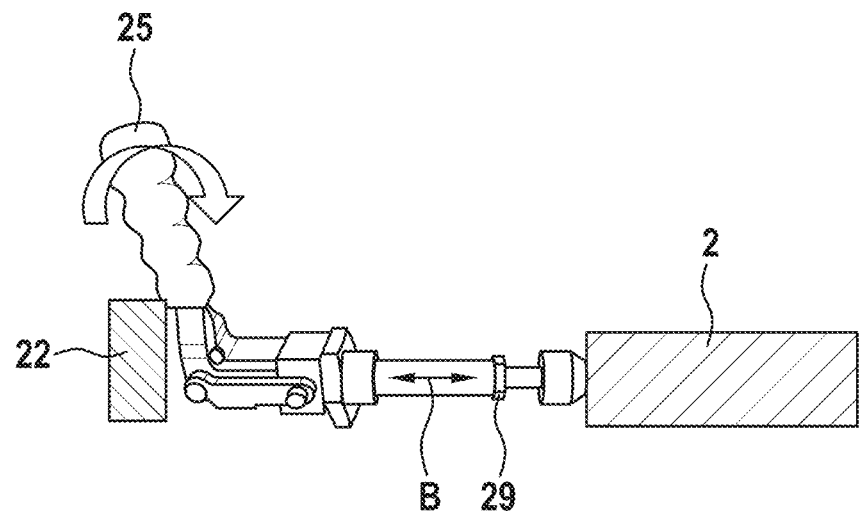
FIG. 15 shows a schematic view of a latch for fixing the strut bar to the body of the vehicle according to a further embodiment of the disclosure.

FIG. 15 shows a schematic view of a latch or clamping lever 25, being an example for a clamping device 24 for fixing the strut bar 2 to the first mounting structure element 22 of the body of the vehicle 1. The latch 25 may be operated manually or may be automatically operated by an actuator. The strut bar 2 can be clamped to the body of the vehicle 1 with a predefined pre-load to secure stiffening of the body of the vehicle 1. The clamping force may be adjusted using an adjustment thread 29.

Figure 16:
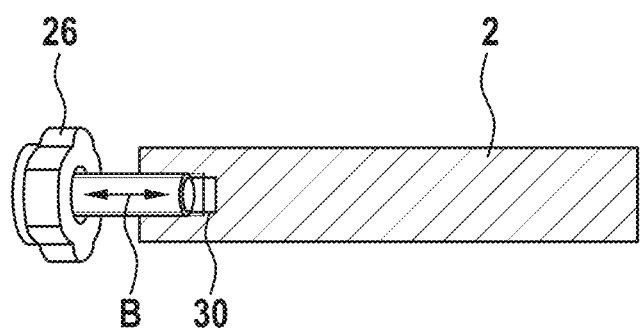
FIG. 16 shows a schematic view of a screw connection for fixing the strut bar to the body of the vehicle according to a further embodiment of the disclosure.

FIG. 16 shows a schematic view of a screw connection 26 for fixing the strut bar 2 to the body of the vehicle 1. The screw 26 engages with an inner thread 30 of the strut bar 2. Again, the screw connection 26 may be operated manually or automatically using an actuator.

Figure 17:
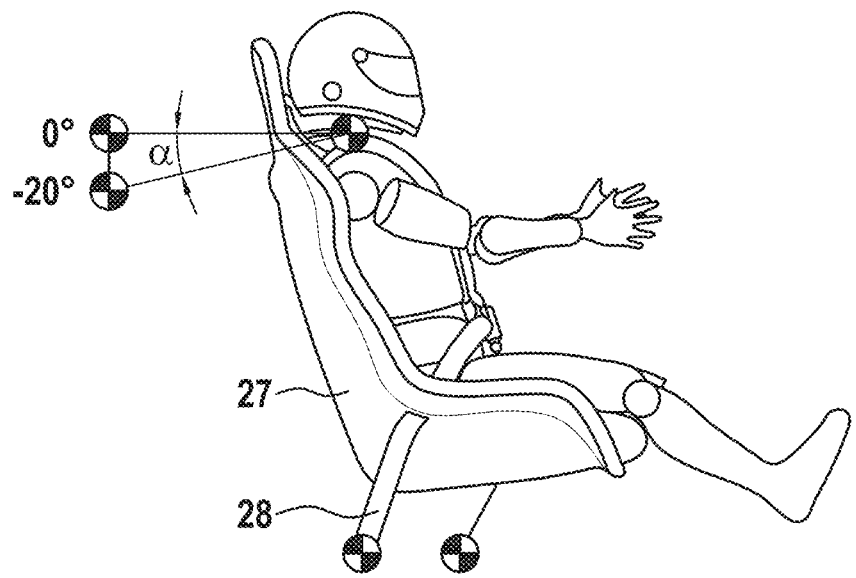
FIG. 17 a schematic view of a driver seat having a racing seatbelt for connecting to the rear seat arrangement according to an embodiment of the disclosure.

FIG. 17 shows a schematic view of a driver seat 27 comprising a racing seatbelt 28 for connecting to a rear seat arrangement according to an embodiment of the disclosure. The racing seatbelt may be any of a 4-, 5- or 6-point seatbelt or harness. An angle α between a horizontal axis and the extension direction of the racing seatbelt towards a mounting location of the racing seatbelt 28 is required to be between two predefined angle values, e.g. 0° and −20°.

Figure 18:
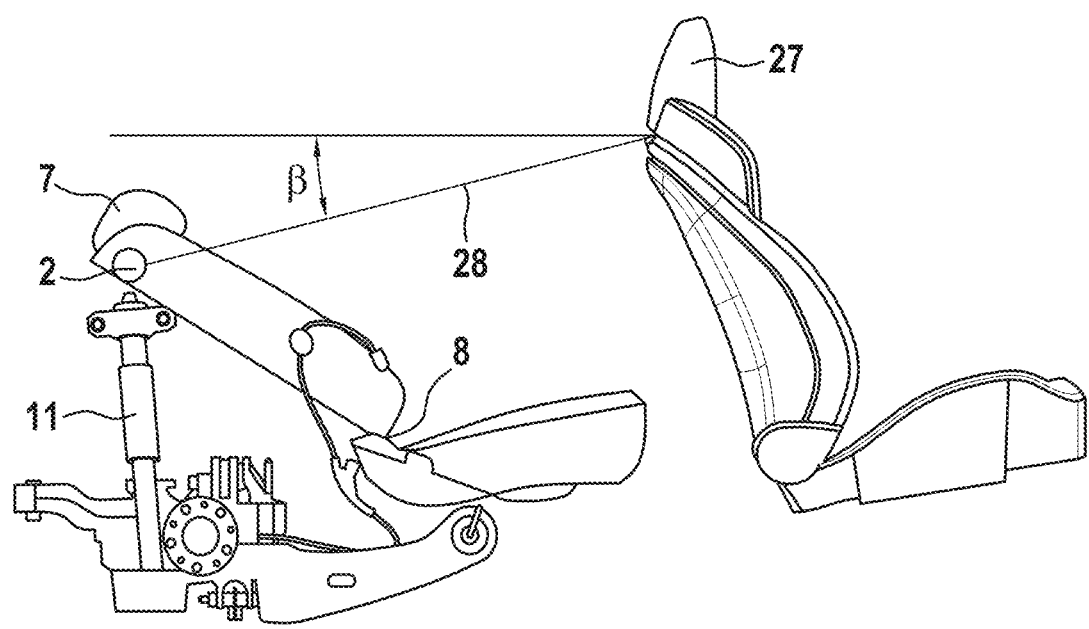
FIG. 18 shows an illustration of a connection of a racing seatbelt to a backrest of the rear seat arrangement according to an embodiment of the disclosure.

FIG. 18 shows an illustration of a connection of a racing seatbelt 28 to a backrest 7 of a driver seat 27. The racing seatbelt 28 may be attached at or close to the strut bar 2. An angle β between a horizontal axis and the extension direction of the racing seatbelt is smaller than a predefined angle values, e.g. around −14°.

Although specific embodiments have been illustrated and described herein, it should be appreciated by those of ordinary skill in the art that a variety of alternate and/or equivalent implementations exist. It should be appreciated that the disclosed embodiment or embodiments are only examples, and are not intended to limit the scope, applicability, or configuration in any way. Rather, the foregoing summary and detailed description should provide those of ordinary skill in the art with a convenient road map for implementing at least one embodiment. It should also be understood that various changes may be made in the function and arrangement of elements described in an embodiment without departing from the scope as set forth in the appended claims and their legal equivalents. Generally, this application is intended to cover any adaptations or variations of the specific embodiments discussed herein.

REFERENCE LIST

1 vehicle
2, 2a, 2b strut bars
2-1, 2-2 strut bar segments
3 stiffening structures
4 rear wheels
5 load path
6a-c rear seat arrangements
7 backrest
7-1, 7-4 backrests
8 pivot axis
9 spring load direction
10 damper load direction
11 damper
12 supporting frame
13a, 13b plug-in connection
14 contact surface
15a-15c connections of strut bar segments
16 latch
17 mounting connection
18 first button
19 second button
20 counterpart
21 mounting element
22 first mounting structure element
23 second mounting structure element
24 clamping device
25 latch
26 screw connection
27 driver seat
28 racing seatbelt
29 adjustment thread
30 inner thread
α angle
β further angle
A moving direction
B further moving direction

The invention claimed is:

1. A rear seat arrangement for a vehicle, the rear seat arrangement comprising:
   at least one backrest, wherein the at least one backrest comprises a strut bar,
   wherein at least one of the at least one backrest is adapted to be pivotally folded into a backward folded position for connecting the strut bar to a mounting structure at a body of the vehicle,
   wherein the at least one backrest comprises two outer backrests and at least one inner backrest, and wherein said at least one inner backrest comprises the strut bar, and
   wherein only the at least one inner backrest is adapted to be pivotally folded into the backward folded position.

2. The rear seat arrangement according to claim 1, wherein the strut bar comprises at least one locking mechanism for connecting the strut bar to the mounting structure at the body of the vehicle.

3. The rear seat arrangement according to claim 1, wherein the at least one backrest comprises a plurality of backrests, wherein at least two backrests of the plurality of backrests comprise respective strut bar segments of the strut bar, and wherein the strut bar segments of the strut bar are connectable to each other.

4. The rear seat arrangement according to claim 3, wherein the strut bar segments are connectable to each other via a plug-in connection.

5. The rear seat arrangement according to claim 3, wherein at least one of the strut bar segments is slidably installed for moving between a mounted position and an unmounted position, wherein the at least one strut bar segment is connected to an adjacent strut bar segment in the mounted position, and wherein the at least one strut bar segment is disconnected from the adjacent strut bar segment in the unmounted position.

6. The rear seat arrangement according to claim 3, wherein the at least two backrests comprising the respective strut bar segments are adapted to be independently folded in a condition when the strut bar segments are not connected to each other.

7. The rear seat arrangement according to claim 1, wherein the at least one backrest comprises a supporting frame, and wherein the strut bar is at least partially formed by at least part of the supporting frame.

8. The rear seat arrangement according to claim 1, wherein the strut bar is attached to a back portion of the at least one backrest.

9. The rear seat arrangement according to claim 1, wherein the at least one backrest comprises a mounting device for mounting a racing seatbelt.

10. A vehicle comprising:
a body having a mounting structure for a strut bar;
a rear seat arrangement including at least one backrest, wherein the at least one backrest comprises the strut bar, and wherein at least one of the at least one backrest is adapted to be pivotally folded into a backward folded position; and
rear dampers and springs,
wherein the strut bar of the rear seat arrangement is connectable to the mounting structure of the body of the vehicle with the at least one backrest in the backward folded position, and
wherein the mounting structure for the strut bar is arranged in a load path of the rear dampers and springs.

11. The vehicle according to claim 10, wherein the mounting structure at the body of the vehicle comprises at least one latch for fixing the strut bar to the body of the vehicle.

12. The vehicle according to claim 10, wherein the mounting structure comprises at least one screw connection for fixing the strut bar to the body of the vehicle.

13. The vehicle according to claim 12, further comprising an actuator adapted to automatically fix the strut bar to the body of the vehicle via the at least one screw connection.

14. The vehicle according to claim 10, further comprising a racing seatbelt connectable or connected to a mounting device of the at least one backrest of the rear seat arrangement.

* * * * *